(12) United States Patent
Cao et al.

(10) Patent No.: US 8,861,699 B2
(45) Date of Patent: Oct. 14, 2014

(54) ELECTRONIC DISPLAY METHOD AND DEVICE

(71) Applicant: Lenovo (Beijing) Co., Ltd., Beijing (CN)

(72) Inventors: Jie Cao, Beijing (CN); Chaohong Xie, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 13/955,753

(22) Filed: Jul. 31, 2013

(65) Prior Publication Data

US 2014/0037079 A1    Feb. 6, 2014

(30) Foreign Application Priority Data

Aug. 1, 2012 (CN) .......................... 2012 1 0271815

(51) Int. Cl.
*H04M 1/56* (2006.01)
*H04M 3/42* (2006.01)
*H04M 1/656* (2006.01)

(52) U.S. Cl.
CPC ...... *H04M 3/42059* (2013.01); *H04M 2201/38* (2013.01); *H04M 3/42221* (2013.01); *H04M 3/42102* (2013.01); *H04M 2201/40* (2013.01); *H04M 1/656* (2013.01)

USPC ....................................... 379/142.17; 715/700

(58) Field of Classification Search
CPC ........................... H04M 15/723; H04M 11/066
USPC ................ 379/93.15, 100.13, 142.14, 142.17
See application file for complete search history.

(56) References Cited

U.S. PATENT DOCUMENTS

| | | | |
|---|---|---|---|
| 2002/0188443 A1* | 12/2002 | Reddy et al. | 704/231 |
| 2006/0227948 A1* | 10/2006 | Pearson et al. | 379/136 |
| 2007/0226199 A1* | 9/2007 | Moore et al. | 707/3 |
| 2008/0192908 A1* | 8/2008 | O'Keefe et al. | 379/93.17 |
| 2010/0104087 A1* | 4/2010 | Byrd et al. | 379/265.09 |
| 2012/0106728 A1* | 5/2012 | Ghaffari et al. | 379/211.02 |
| 2013/0195264 A1* | 8/2013 | Kirchhoff et al. | 379/212.01 |

* cited by examiner

*Primary Examiner* — Creighton Smith
(74) *Attorney, Agent, or Firm* — Dentons US LLP (57) ABSTRACT

The present invention is directed to a display method and an electronic device. The method comprises acquiring a first display instruction; in response to the first display instruction, displaying the second ID identification on the display unit, and displaying M first content identifications simultaneously, wherein, the first content identification is used for characterizing the communication content of the call process of the first ID identification and the second ID identification, and M is a positive integer greater than or equal to one.

6 Claims, 7 Drawing Sheets

Call Log

Zhang San

134XXXXXXXX

134XXXXXXXX

134XXXXXXXX

Fig. 8

A: Hello, Mr. B.
B: Hello.
A: You've called me before. What's the matter?
B: Oh, you know, I am a patent attorney in XXX patent agency. I have an invention case No. 6265 of yours, and I'm the attorney responsible for this case. I need to discuss with you about the technical solution. Do you have time now?
A: Yes, go ahead.
......
B: Thanks for your help, bye.
A: Goodbye.

Fig. 9

An Example of Q First Content Identifications

1: Patent, Weights: 8.865

2: Attorney, Weights: 7.9

3: Invention, Weights: 11.225

4: 6265, Weights: 9.4

5: Technical solutions, Weights: 5.45

ELECTRONIC DISPLAY METHOD AND DEVICE

CROSS REFERENCE TO RELATED APPLICATIONS

This application claims the benefit under 35 U.S.C. §119 (a) of Chinese Patent Application No. CN 201210271815.4, filed on Aug. 1, 2012, the entire disclosure of which is incorporated by reference herein in its entirety.

TECHNICAL FIELD

The present invention relates generally to the field of electronic technology and, more particularly, to a display method and an electronic device.

BACKGROUND

At present, after two users finish a call, the electronic device will often save the other party's telephone number. For example, if user A and user B are talking on the telephone and after they finish the call, the electronic device used by user A will save the identification ("ID")—also referred herein as "ID identification"—used when talking, the call time, the call duration, etc. of user B.

However, during the course of implementing the present application, the following technical problems are found in the prior art.

In conventional art, when user A and user B are talking on the telephone, the communication content of both users during the call process can be recorded only by using the speech recording mode, and the communication content of both users during the call process is not saved in any form of text. Therefore, the user may lose the communication content because he/she has not saved the communication content. For example, user B asks user A to help with something. After user A and user B have finished the call, no communication content is recorded. When it occurs to user A that user B has asked him/her to help with something, since no communication content was recorded, user A may not be able to remember anything.

SUMMARY

The present invention provides a display method and an electronic device, for solving the technical problem in the prior art of not saving the communication content during the call process in any form of text.

In a first aspect, the present invention provides the following technical solutions through one embodiment of the present application: a display method, applied to a first electronic device which comprises a display unit and a communication unit, the first electronic device having a first ID identification, and the first ID identification being used for indicating a first user, a second electronic device having a second ID identification, and the second ID identification being used for indicating a second user, wherein the first electronic device uses the communication unit to establish a communication connection between the first ID identification and the second ID identification with the communication unit of the second electronic device, so that the first user can communicate with the second user, and the first electronic device records the call log of the first ID identification and the second ID identification. This method comprises acquiring a first display instruction; in response to the first display instruction, displaying the second ID identification on the display unit, and displaying M first content identifications simultaneously, wherein, the first content identification is used for characterizing the communication content of the call process of the first ID identification and the second ID identification, and M is a positive integer greater than or equal to one.

In one embodiment, the displaying the second ID identification on the display unit, and displaying M first content identifications simultaneously specifically further comprises, after the second ID identification is displayed on the display unit, acquiring the second display instruction; in response to the second display instruction, displaying M first content identifications on the display unit.

In one embodiment, the method, before acquiring a first display instruction, further comprises extracting N first content identifications from the communication content, where, N is a positive integer greater than or equal to one, and N is greater than M; receiving a selection instruction for selecting the M first content identifications from the N first content identifications.

In one embodiment, the extracting N first content identifications from the communication content specifically comprises, according to rules preset by the electronic device, selecting Q first content identifications from the communication content, wherein, Q is a positive integer and greater than or equal to one, and Q is greater than N; when Q first content identifications are selected, calculating the weights of Q first content identifications; according to a threshold value set by the system and in accordance with the weights of Q first content identifications, extracting N first content identifications from Q first content identifications.

In a second aspect, the present invention provides an electronic device through another embodiment of the present application, which comprises a display unit and a communication unit, a first electronic device having a first ID identification, and the first ID identification being used for indicating a first user, a second electronic device having a second ID identification, the second ID identification being used for indicating a second user, wherein the first electronic device uses a communication unit to establish a communication connection between the first ID identification and the second ID identification with the communication unit of the second electronic device, so that the first user can communicate with the second user and the first electronic device stores the call log of the first ID identification and the second ID identification. This method comprises a first acquiring unit for acquiring a first display instruction; a display unit for displaying the second ID identification on the display unit in response to the first display instruction, and displaying M first content identifications simultaneously, wherein, the first content identification is used for characterizing the communication content of the call process of the first ID identification and the second ID identification, and M is a positive integer greater than or equal to one.

In one embodiment, the display unit further comprises a first display sub-unit for acquiring a second displaying instruction after displaying the second ID identification on the display unit; a second display sub-unit for displaying M first content identifications on the display unit in response to the second display instruction.

In one embodiment, the electronic device further comprises an extraction unit for extracting N first content identifications from the communication content, wherein, N is a positive integer greater than or equal to one, and N is greater than M; a first selection unit for receiving a selection instruction and extracting M first content identifications from the N first content identifications.

In one embodiment, the extraction unit specifically comprises a second selection unit for extracting Q first content identifications from the communication content, according the rules preset by the electronic device, wherein, Q is a positive integer greater than or equal to one, and Q is greater than N; a calculation unit for calculating the weight of Q content identifications when Q first content identifications are selected; an extraction sub-unit for extracting N first content identifications from Q first content identifications, according to the threshold value set by the system and in accordance with the weights of the Q first content identifications.

One or more technical solutions of the above technical solutions have the following technical effects or advantages.

In one embodiment of the present application, when the user views the communication log, the electronic device receives a display instruction to display the second ID identification and displays simultaneously the first content identification for characterizing communication content during the call process of the first ID identification and the second ID identification to avoid that the user forgets the communication content. It can be used to solve the technical problem of recording the communication content during the call process of the two users only by using a speech recording mode in the prior art. It has the technical effect of saving the communication content during the call process of the two users in the form of text.

Further, after acquiring the text form of the communication content, the first content identification best characterizing the communication content can be selected through the calculation of the weight of the first content identification extracted from the communication content.

Further, the selection instruction input by the user can be received, and a first content identification needed by the user can be selected. The selection is flexible to meet the needs of the user's own choice.

DETAILED DESCRIPTION OF THE PREFERRED EMBODIMENTS

In order to solve the technical problem in the prior art that no communication content in the call process is saved in any form of text, an embodiment of the present invention proposes a display method and an electronic device, and the general idea of the solutions is as follow:

When two users are talking on the telephone, for example, when user A and user B are talking on the telephone, the communication content will be filtered by a series of rules in the electronic device, and the content identification, which can best characterize the communication content, can be selected and saved in the user's electronic device or the relay server (such as a third-party server). By using the electronic device, when browsing the call log, and in the meantime when acquiring a second ID identification of the other party, the content identification of the conversation between this electronic device and a second electronic device with the second ID identification is displayed to acquire the reminder of the last, or several previous, call content between the two users.

With reference to the accompanying figures, the main implementation principle, the specific implementation process, and the corresponding beneficial effects that can be achieved will be described in detail.

In a first embodiment of the present application, a display method is described. The method is mainly applied to a first electronic device, wherein the first electronic device includes a display unit and a communication unit.

Wherein, the first electronic device has a first ID identification, and the first ID identification is used for indicating a first user. The second electronic device has a second ID identification, and the second ID identification is used for indicating the second user.

Wherein, the first electronic device uses its communication unit to establish a communication connection between the first ID identification and the second ID identification with the communication unit of the second electronic device, so that the first user can communicate with the second user. The first electronic device records the call log of the first ID identification and the second ID identification.

In the above description, the first electronic device has many ID identifications, such as the SIM card number, QQ number, etc. When the ID identification is mainly the SIM card number, the first ID identification in the first electronic device is used to indicate the first user, which means that the first ID identification is the SIM card number representing the first user's identity.

The second electronic device is similar to the first electronic device, and the second ID identification of the second electronic device is used to indicate the second user, which means that the second ID identification is the SIM number representing the second user's identity. For example, 134XXXXXXXX represents Zhang San, or the corresponding contact of 134XXXXXXXX in the first electronic device is Zhang San. Therefore, in the embodiment of the present invention, when displaying the second ID identification, if the associated relationship with the contact has already been established, the name of the contact determined according to the second ID identification is displayed. If the associated relationship with the contact has not been established, the second ID identification itself is displayed.

Figure 8:
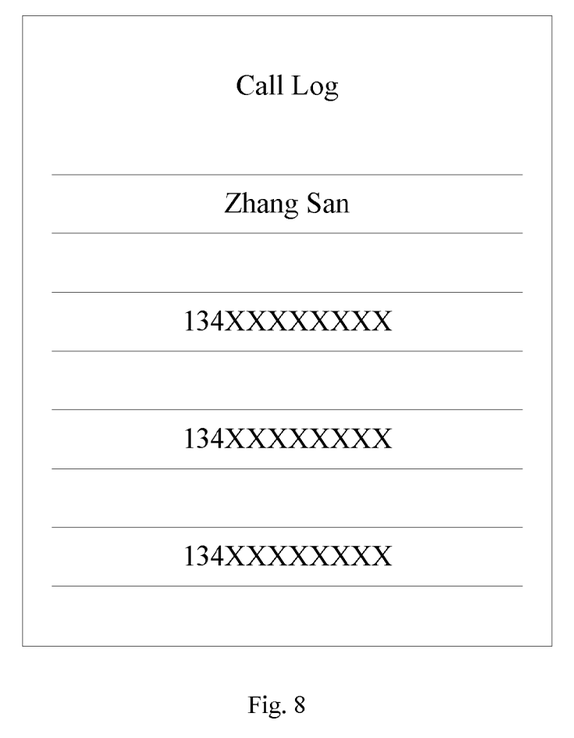
FIG. 8 is a schematic diagram of an example of a call log.

The first electronic device uses its communication unit to establish a communication connection between the first ID identification and the second ID identification with the communication unit of the second electronic device, so that when the first user communicates with the second user, the first electronic device will record the call log between the two users. The call log is recorded in any form of text and is stored in the first electronic device or in a third-party server. The call log can be called when needed. FIG. 8 illustrates an example of a call log, as discussed above.

Specifically, when the first user and the second user are talking on the telephone, the process to convert the speech communication content of the two uses into the communication content recorded in the form of text will be described in detail in the following embodiment. The manner in which the first content identification and the second ID identification are displayed in the first electronic device will be described in detail.

Figure 1:
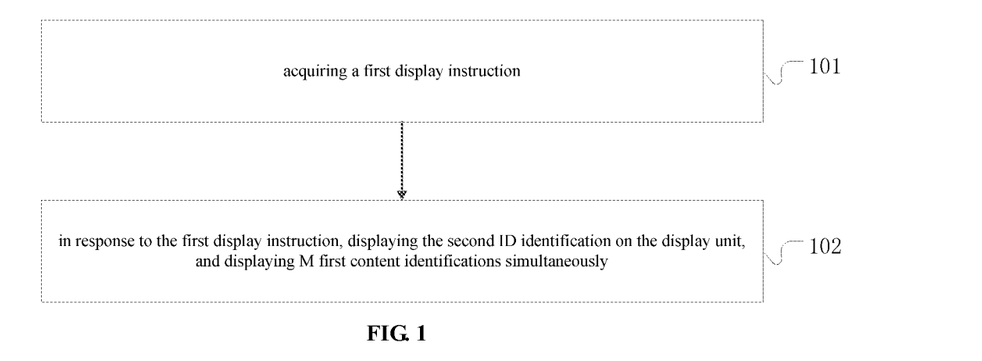
FIG. 1 is the flowchart of the display method in the embodiment of the present application.

As shown in FIG. 1, the method to display the first content identification and the second ID identification in the first electronic device specifically comprises:

At Step 101, a first display instruction is acquired.

At Step 102, in response to the first display instruction, the second ID identification is displayed on the display unit, and M first content identifications are displayed simultaneously.

Wherein, the first content identification is used for characterizing the communication content during the communication process of the first ID identification and the second ID identification, and M is a positive integer greater than or equal to one.

The method herein is to acquire the first user's speech stream and the second user's speech stream, respectively, after the two users have established a call connection, to convert the speech communication content into communication content in the form of text and to extract the first content identification from the communication content in the form of text. The first content identification is stored in the first electronic device or in a third-party server so that it can be displayed altogether, based on the first display instruction, when the first electronic device displays the second identification representing the second user.

For example, when user A (user A is the first user) uses the first electronic device to search for the call log of the call with user B (user B is the second user), the first electronic device is operated. At this time, on the first electronic device side, in the page of the call log, a number of ID identifications (not the first ID identification) will be displayed. Each of the ID identifications is used to indicate one user. The user calls the application/application program of the call log with an operation. The first electronic device obtains the operation of calling the call log through a sensor, performs the call operation, and displays the page corresponding to the application/application program of the call log. At this time, on the first electronic device side, when acquiring the first display instruction of performing the call operation and displaying the page corresponding to the application/application program of the call log, the content identification, corresponding to each ID identification, is displayed. That is, the content identification corresponding to each ID identification is displayed simultaneously when each ID identification is displayed. The second ID identification is displayed when calling, and the first content identification is displayed in association with it.

In another embodiment of the present invention, when the first electronic device displays multiple ID identifications in the page corresponding to the application/application program of the call log, the user performs specific operations on determined ID identifications according to his/her needs. The first electronic device additionally displays the content identification on the determined ID identification after it obtains the specific operation.

In yet another embodiment of the present invention, when the first user is talking to the second user on the telephone and after the first electronic device obtains the first user's specific operations through a sensor, the user performs extraction of content identification on the communication content of the call so that the first electronic device will display the content identification, correspondingly when the first electronic device displays the ID identification of the other party (the second user) of the call. In other words, if the extraction function of the content identification is not triggered during the call process, the first electronic device can only display the ID identification of the other party (the second user) when displaying the call log.

When the first electronic device stores the first content identification, there is a variety of ways. As described above, the first content identification can be stored in the first electronic device or a third party server. However, at this time, when the first content identification is stored in the first electronic device, it can be stored with the second ID identification, namely, in the same page. When the user views the second ID identification, the first content identification can be simultaneously displayed. Of course, when the first content identification is stored in the third-party server, it is directly displayed on the first electronic device by the address of the first content identification at the same time when the first electronic device displays the second ID identification. That is, the second ID identification is stored in the first electronic device locally, and the second ID identification is stored in the third party sever, both of which are displayed on the first electronic device simultaneously.

However, in the actual case, besides the synchronized display, when, for example, the second ID identification and the first content identification are stored in the call log but they are not displayed in the same page, the first content identification can be acquired by the following steps.

First, after the second ID identification is displayed on the display unit, the second display instruction is acquired.

Next, in response to the second display instruction, M first content identifications are displayed on the display unit.

Of course, the present application is not intended to limit the specific number of the first content identifications.

In addition to the above two cases, the first content identification can also be stored on a third-party server, and the display manner at this time is similar to that of the above second case. Namely, after the second ID identification is displayed on the display unit, the second display instruction is acquired, and then, the first content identification is extracted in the third party server and displayed.

The above method is the specific method for displaying the second identification and the first content identification, and the specific generation method is described in the following embodiment.

In a second embodiment of the present application, this embodiment is directed to the process of converting the speech communication content between user A and user B into communication content in the form of text. Secondly, how to extract the first contents identification from the communication content, after acquiring the communication content in the form of text for prompting the user, is described.

Wherein, there are two methods for the conversion manner.

The first one is as follow.

When user A and user B are talking on the telephone, the service provider is required to be involved. For example, the call or messages between user A and user B are supported by service providers (Telecom, China Unicom, and other network services). When user A and user B perform speech calls, video calls, and the like through QQ, the support of QQ services are needed. According to the embodiments of the present invention, the speech or video digital signals converted in the respective local devices of the two sides are directly identified and converted on the server side of the service provider. On the server side of the service provider, the communication content of the speech call or video call of user A and user B are identified and converted into text information. Thus, in the embodiment of the present invention, when user A and user B complete the speech call or video call, the text content is forwarded to the first electronic device of user A and the second electronic device of user B respectively. This facilitates the extraction of content identification by the first electronic device or the second electronic device. Further, according to the embodiments of the present invention, the content identification can be directly extracted and generated on the server side of the service provider. The server of the service provider stores the content identification or forwards it to the first electronic device so that it can be displayed altogether, when the first electronic device displays the identification of user B. In the embodiment of the present invention, the server of the service provider needs to have a speech recognition engine, and the local device (the first electronic device) does not need to be changed, thus the cost is low. Meanwhile, the server of the service provider is made up of multiple computing devices so the database is large, and thus, the effects of high speed and high accuracy of the recognition can be achieved.

The second one is as follow.

When user A and user B are talking on the telephone, the speech analog signals of the first user or user A, collected at the microphone of the first electronic device, are converted into speech digital signals by a conversion unit in sound card part. Then the speech digital signals are sent to the speech recognition engine (which can be either the speech recognition software installed in the first electronic device or the recognition engine used by the cloud). The speech digital signal of the second user or user B, received by the communication module of the first electronic device, is also sent to the speech recognition engine. Wherein, they are sent to the speech recognition engine according to the time sequence of the dialogue between the first user and the second user to ensure that the recognized and converted text is consistent with the communication content of the actual dialogue process. That is, the speech communication content is converted into the communication content in the form of text and stored in the first electronic device or a third-party server.

Figure 2:
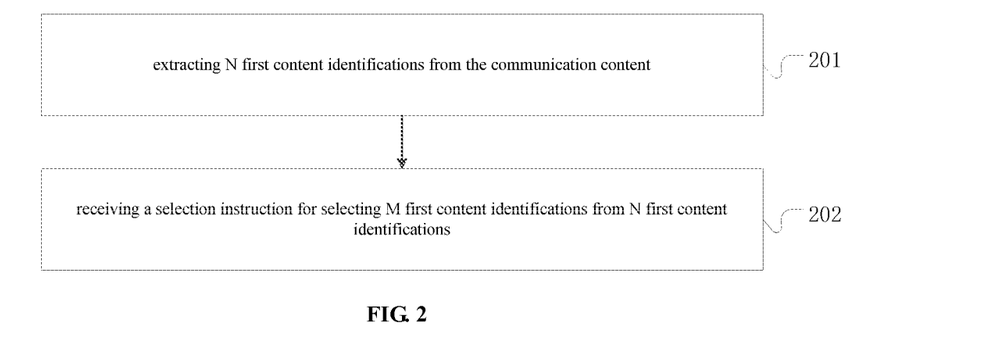
FIG. 2 is a method flowchart of acquiring the first content identification from the communication content in the embodiment of the present application.

When the communication content recorded in the form of text is acquired, a first content identification will be acquired from the communication content, as shown in FIG. 2. The specific method is as follow.

At Step 201, N first content identifications are extracted from the communication content.

Where, N is a positive integer greater than or equal to one, and N is greater than M.

Figure 3:
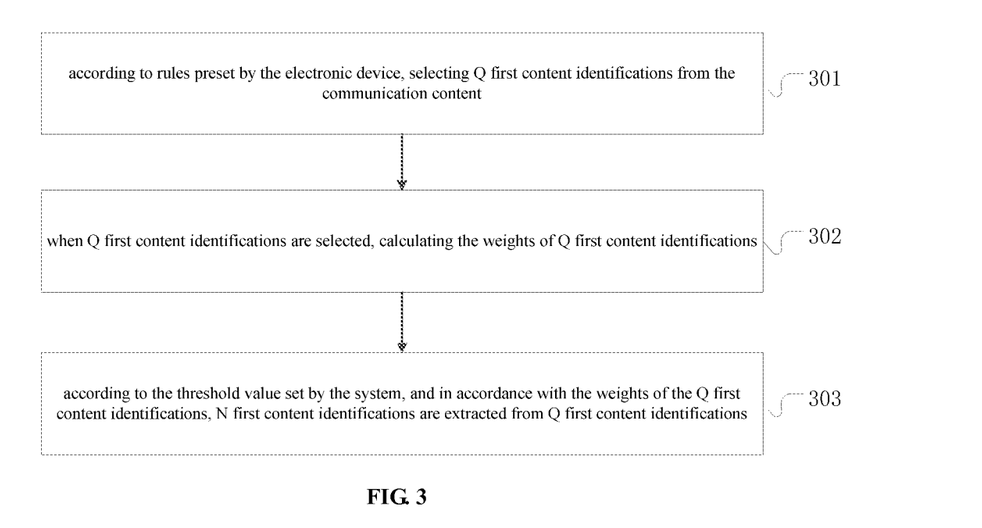
FIG. 3 is a method flowchart of extracting N first content identifications from the communication content of the embodiment of the present application.

Regarding how to extract the N first content identifications from the communication content, the specific steps are shown in FIG. 3 as follows:

At Step 301, according to the preset rules of the electronic device, Q first content identifications are selected from the communication content.

Wherein, Q is a positive integer greater than or equal to one, and Q is greater than N.

For example, users A and B are on a call, the call content is as follows:

A: Hello, Mr. B.

B: Hello.

A: You have called me before. What is the matter?

B: Oh, you know, I am a patent attorney in XXX patent agency. I have an invention case No. 6265 of yours, and I am the attorney responsible for this case. I need to discuss with you about the technical solution. Do you have time now?

A: Yes, go ahead.

. . . .

B: Thanks for your help, bye.

A: Goodbye.

Figure 9:
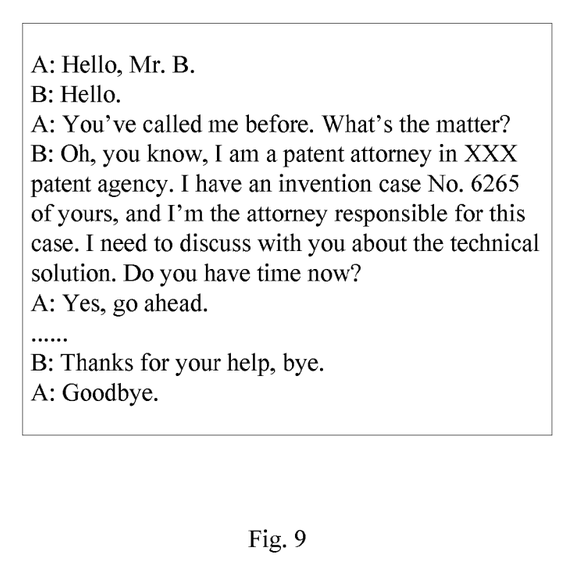
FIG. 9 is a schematic diagram of an example of communication content.

FIG. 9 illustrates an example of communication content with respect to the above-mentioned call between users A and B. The above dialogue is a dialogue about a patent, but there are also many identifications that are unrelated to the patent, such as "Hello", "what", etc. Therefore, firstly, rules will be pre-set in the electronic devices. For example, an identification vocabulary will be pre-set in the electronic device with a variety of less important identifications. According to the pre-set rules of the electronic device, the same words in the identification vocabulary will be deleted. Therefore, the following identifications will remain:

Patent, Occurrence: 3

Attorney, Occurrence: 2

Invention, Occurrence: 1

6265, Occurrence: 1

Technical solutions, Occurrence: 1

At Step 302, when Q first content identifications are selected, the weights of Q first content identifications are calculated.

After acquiring the above five identifications, the weight of each identification can be calculated.

In the embodiments of the present application, it can be calculated according to the formula $$f(W_i) = A_i/T + \sum_{j=1}^{N} \alpha_j L_{ij} + B_i/Q.$$

Wherein the meaning of each letter in the above formula is as follow:

i represents the first content identifier.

$f(w_i)$ is the respective weight of each first content identification.

$A_i$ is the total number of times that the first content identification acts as the first content identification in the previous call log. As in the above example:

Patent: Occurrence 10

Attorney: Occurrence 5

Invention of: Occurrence 20

6265: Occurrence 10

Technical solutions: Occurrence 5

T is total number of times that user A communicates with user B, assuming T is five.

$$\sum_{j=1}^{N} \alpha_j L_{ij}$$

is the location impact weight of the first content identification in the communication content.

j is the individual occurrence times of the first content identification in the communication content.

N is the total occurrence times of the first content identification in the communication content.

$a_j$ is the impact ratio in the location when the first content identification occurs in different locations. The first content identification has different impact ratios in the communication content according to different locations. The ratio range is (0,1). For example, in the above embodiment, "patent" has different location impact ratios according to its different communication locations, namely, 0.5, 0.6, 0.7, respectively.

As can be seen from the above, the impact ratio can be arranged based on the order from front to back, that is, the more it is near the back of the communication content, the more important it is and the larger the impact ratio is.

In the actual content, the impact ratio is arranged based on the order from front to back or from back to front, which is not limited by the present application.

Lij is the impact ratio of the part of speech represented by the location when the first content identification is at different locations. For example, if the system identifies the first content identification as the subject and noun, the impact ratio is 0.8; if it is identified as the object and noun, the impact ratio is 0.7; if it is identified as the predicate and verb, the impact ratio is 0.3, etc.

For example, in the above example, the "patent" has different part of speech ratios according to the different parts of speech, namely: 0.5, 0.4, and 0.7.

In the actual case, the first content identification has different parts of speech when it is at different locations. When it has different parts of speech, it can be calculated according to $$\sum_{j=1}^{N} \alpha_j L_{ij}.$$

For example, in the embodiments of the present application, the impact weight of the location of "patent" is calculated in the communication content. According to the above statistics, "patent" appears three times in the communication content.

According to the above example, the following can be learnt:

The first time: position impact ratio 0.5, part of speech (POS) impact ratio 0.5.

The second time: position impact ratio 0.6, POS impact ratio 0.4.

The third time: position impact ratio 0.7, POS impact ratio 0.7.

Therefore, we can calculate the location impact weight of "patent" in the communication content, and it is 0.98.

According to the above similar algorithm, the respective position impact weights of the above first content identifications can be calculated:

Patent: position impact weight 0.98
Attorney: position impact weight 0.8
Invention: position impact weight 0.455
6265: position impact weight 0.7
Technical solutions: position impact weight 0.25

$B_i$ is occurrence time of the first content identification in the communication content, and its meaning is consistent with N. Q is the number of the first content identifications selected from the communication content. In the embodiment of the present invention, Q=5.

According to the above formula, the respective weight of the first content identifications can be acquired:

Patent: weight 3.58
Attorney: weight 2.2
Invention: weight 4.655
6265: weight 2.9
Technical solutions: weight 1.45

In the embodiment of the present invention, the above listed formulas to calculate weights are merely intended to illustrate and explain the present application and are not intended to limit the application. The present application can use other formulas for calculating weights to calculate the above communication content. In addition, the present application can further optimize the weight of the first content identification acquired from the above formula based on the above-calculated weight, thereby acquiring a more accurate weight.

For example, when acquiring the weight of the above respective first content identifications, it can also be calculated according to the formula $$optf(W_i) = f(W_i) + \sum_{j=1}^{N-1} \log_{t_j} e_j + \log_{minT_i} \max E_i$$

Wherein, opt $f(_{W\ i})$ is the optimized weight of the first content identification.

$f(_{W\ i})$ is the weight of the first content identification.

$$\sum_{j=1}^{N} \log_{t_j} e_j$$

is the speech time energy feature of the first content identification.

j is individual occurrence time of the first content identification in the communication content.

N represents the total occurrence times of the first content identification in the communication content.

$e_j$ is speech energy value of the first content identification every time it appears in the communication content.

$t_j$ is the time interval of the first content identification in the communication content between the time when it appears currently and the time when it appeared previously.

As the above example, "patent" has the following speech energy values and time intervals.

The first time, the speech energy value: 3, the time interval value 1.

The second time, the speech energy value: 5, the time interval value 5.

The third time, the speech energy value: 6, the time interval value 10.

Since the same content identification is not found in the communication content after "patent" has appeared for three times, the time interval here is considered to be the time interval after "patent" appears for the third time and before the last word in the communication content, namely, the second "bye".

The speech energy value is acquired through analysis of the speech acquired in the system and comparison with the rules set in the system.

Thus, it can be calculated that the "patent" speech time energy feature is: 2.285.

According to these calculations, the following can be acquired:

Patent: speech time energy feature 2.285
Attorney: speech time energy feature 2.7
Invention: speech time energy feature 3.6
6265: speech time energy feature 3.5
Technical solutions: speech time energy feature 1

$\log_{minT_i} \max E_i$ is the relationship feature between the maximum speech energy value and the minimum time interval in the first content identifications.

$\max E_i$ is the maximum speech energy value in the first content identifications.

$\min T_i$ is the minimum time interval value in the first content identifications.

By calculation, $\log_{minT_i} \max E_i$ can be acquired to be 3.

Therefore, with the above calculation, the following weights after optimization can be acquired.

Patent: optimized Weight 8.865
Attorney: optimized weight 7.9
Invention: optimized weight 11.255
6265: optimized weight 9.4
Technical solutions: optimize weight 5.45

When calculating the weight or optimized weight of each first content identification, the following steps are performed.

Figure 10:
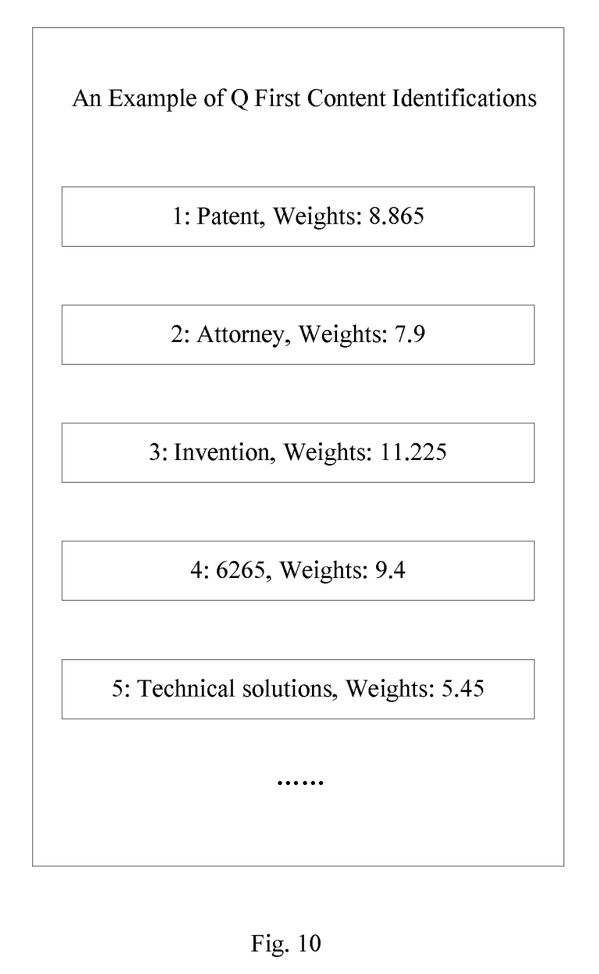
FIG. 10 is a schematic diagram of an example of Q First Content Identifications.
Figure 11:
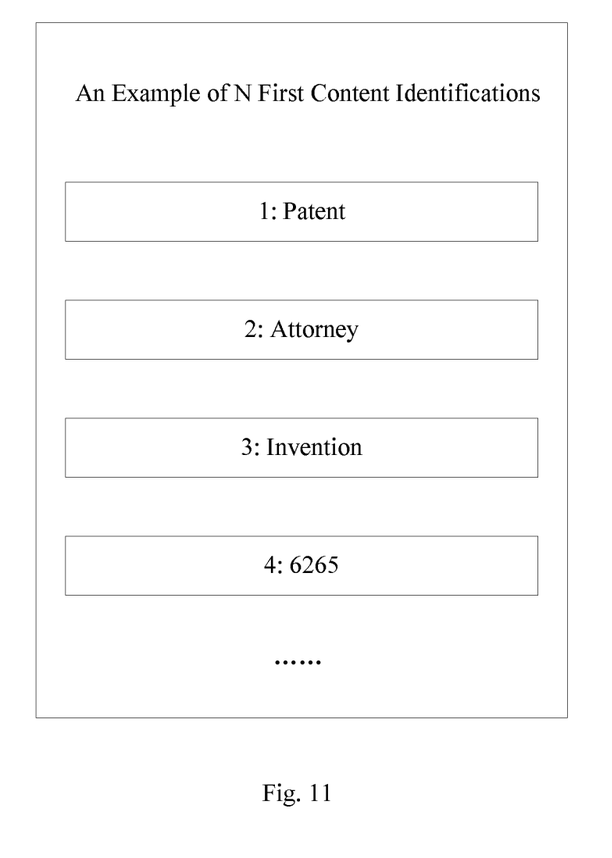
FIG. 11 is a schematic diagram of an example of N First Content Identifications.

At Step 303, according to the threshold value set by the system, and in accordance with the weights of the Q first content identifications, N first content identifications are extracted from Q first content identifications. FIG. 10 illustrates an example of Q First Content Identifications in accordance with the example discussed above. FIG. 11 illustrates an example of N First Content Identifications in accordance with the example discussed above.

The threshold set by the system is the threshold of the preserved number of the first content identifications prescribed by the system. For example, the system sets to preserve four first content identifications. Therefore, if the weight is taken as an example, four first content identifications can be extracted from the above five first content identifications according to the weights, which are patent, patent agent, invention, and 6265, respectively.

When acquiring the above four first content identifications, the system will save the four first content identifications. If the user saves only three first content identifications according to his/her setting, the following steps will be performed on the first electronic device side.

Figure 12:
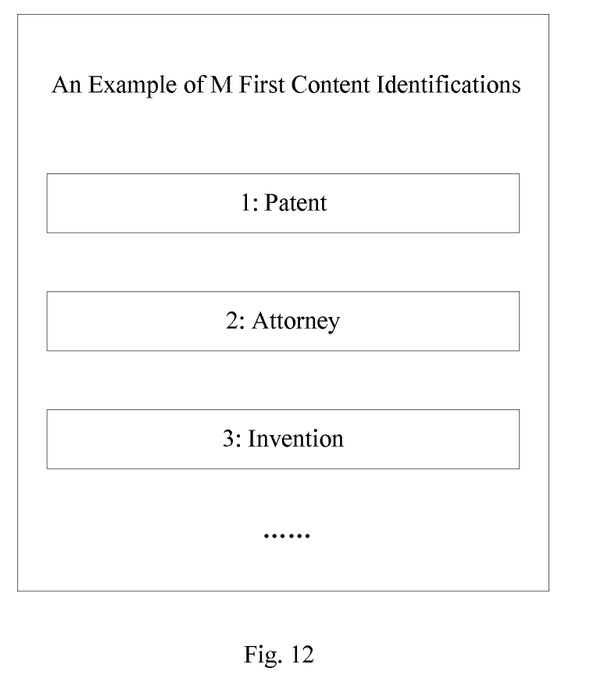
FIG. 12 is a schematic diagram of an example of M First Content Identifications.

At Step 202, a selection instruction is received. M first content identifications are selected from the N first content identifications. FIG. 12 illustrates an example of M First Content Identifications in accordance with the example discussed above.

Wherein, when the first electronic device preserved four first content identifications, a selection instruction can be received and three first content identifications are selected from the four first content identifications.

In the embodiment of the present application, in addition to the above manners, the user can also manually enter the first content identification to the communication log to prompt the user about the meaning contained in the communication content.

In the embodiment of the present application, when the user views the communication log, the electronic device receives a display instruction to display the second ID identification and displays simultaneously the first content identification for characterizing communication content during the call process of the first ID identification and the second ID identification to avoid that the user forgets the communication content. It can be used to solve the technical problem of recording the communication content during the call process of the two users only by using a speech recording mode in the prior art. It has the technical effect of saving the communication content during the call process of the two users in the form of text.

Further, after acquiring the communication content in the form of text, the first content identification best characterizing the communication content can be selected through the calculation of the weight of the first content identification extracted from the communication content.

Further, the selection instruction can be received by the user's input, and the first content identification needed by the user can be selected. The selection is flexible to meet the needs of the user's own choice.

Figure 4:
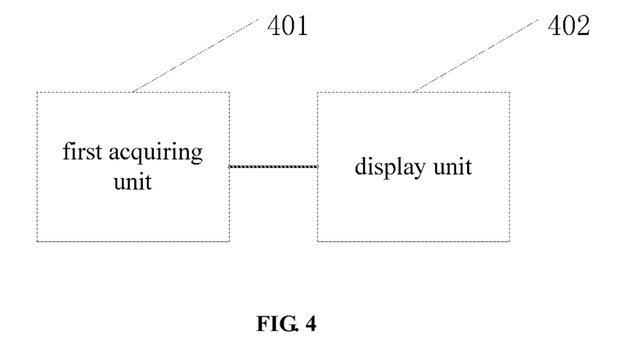
FIG. 4 is a schematic diagram of the electronic device.

In a third embodiment of the present application, an electronic device is described, comprising a display unit and a communication unit. A first electronic device has a first ID identification. The first ID identification is used to indicate a first user. A second electronic device has a second ID identification. The second ID identification is used to indicate a second user. Wherein, the first electronic device uses the communication unit to establish the communication connection of the first ID identification and the second ID identification with the communication unit of the second electronic device, so that the first user and the second user can communicate and the first electronic device records the call log of the first ID identification and the second ID identification, as shown in FIG. 4, comprising:

A first acquiring unit 401, for acquiring a first display instruction.

A display unit 402, for displaying the second ID identification on the display unit in response to the first display instruction and displaying M first content identifications simultaneously, wherein, the first content identification is used to representing communication content during the call process of the first ID identification and the second ID identification, and M is a positive integer greater than or equal to one.

Figure 5:
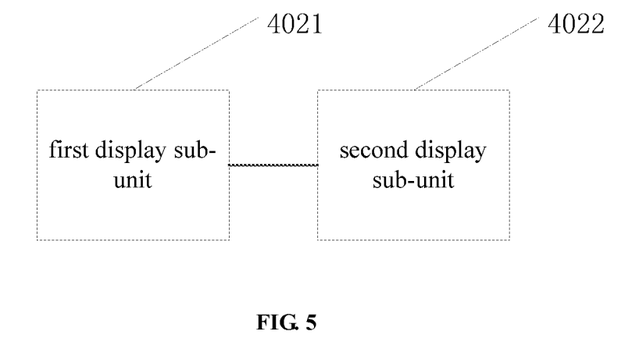
FIG. 5 is a schematic diagram of the display unit.

Further, as shown in FIG. 5, the display unit 402 specifically further comprises:

A first display sub-unit 4021 for acquiring a second display instruction after displaying the second ID identification on the display unit.

A second display sub-unit 4022 for displaying M first content identification on the display unit in response to the second display instruction.

Figure 6:
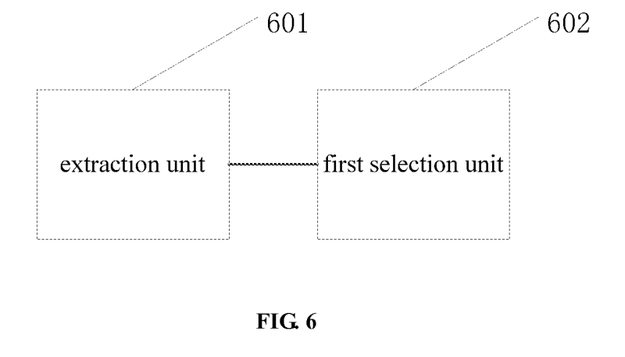
FIG. 6 is a schematic diagram of the electronic device.

Further, as shown in FIG. 6, the electronic device further comprises:

An extraction unit 601 for extracting N first content identifications from the communication content, wherein, N is a positive integer greater than or equal to one, and N is greater than M.

A first selection unit 602 for receiving a selection instruction and extracting M first content identifications from N first content identifications.

Figure 7:
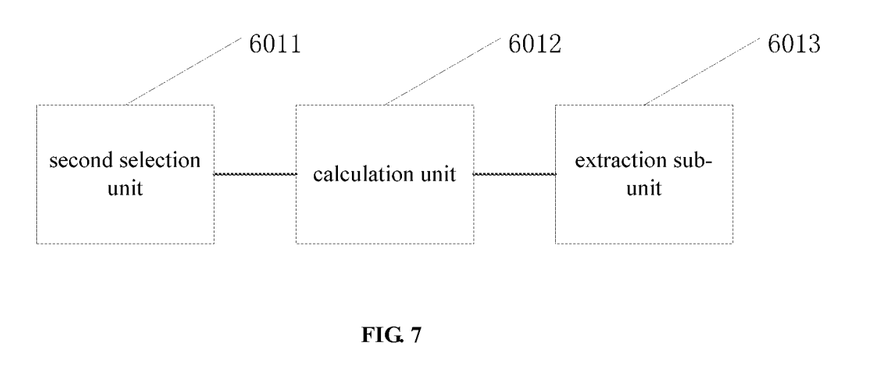
FIG. 7 is a schematic diagram of the extracting unit.

Further, as shown in FIG. 7, the extraction unit 601 specifically comprises:

A second selection unit 6011 for extracting Q first content identifications from the communication content according the rules preset by the electronic device, wherein, Q is a positive integer greater than or equal to one, and Q is greater than N.

A calculation unit 6012 for calculating the weight of Q first content identifications when selecting Q first content identifications.

An extraction sub-unit 6013 for extracting N first content identifications from Q first content identifications according to the threshold set by the system and the weights of the Q first content identifications.

The technical effects can be achieved through the one or more embodiments of the present invention.

In the embodiments of the present application, when the user views the call log, the electronic device receives a display instruction to display the second ID identification and displays, simultaneously, the first content identification for characterizing communication content during the call process of the first ID identification and the second ID identification to avoid that the user forgets the communication content. It can be used to solve the technical problem of recording the communication content during the call process of the two users only by using a speech recording mode in the prior art. It has the technical effect of saving the communication content during the call process of the two users in the form of text.

Further, after acquiring the communication content in the form of text, the first content identification best characterizing the communication content can be selected through the calculation of the weight of the first content identification extracted from the communication content.

Further, the selection instruction can be received by the user's input, and the first content identification needed by the user can be selected. The selection is flexible to meet the needs of the user's own choice.

Those skilled in the art can make various modifications and variations for the invention without departing from the spirit and scope of the invention. Thus, if, these modifications and variations of the present invention belong to the scope of the claims of the invention and their equivalents, the present invention is also intended to include these modifications and variations.

What is claimed is:

1. A display method, applied to a first electronic device having a display unit and a communication unit, the first electronic device having a first ID identification, and the first ID identification being used for indicating a first user, a second electronic device having a second ID identification, and the second ID identification being used for indicating a second user, the first electronic device using the communication unit to establish communication connection between the first ID identification and the second ID identification with the communication unit of the second electronic device for communication between the first user and the second user, the first electronic device recording a call log of the first ID identification and the second ID identification, the method comprising:
   extracting N first content identifications from communication content in which N is a positive integer greater than or equal to 1;
   receiving a selection instruction to select M first content identifications from the N first content identifications in which N is greater than M;
   acquiring a first display instruction; and
   in response to the first display instruction, displaying the second ID identification on the display unit, and displaying the M first content identifications simultaneously,
   wherein,
      the first content identification is used for characterizing the communication content of a call process of the first ID identification and the second ID identification, and
      M is a positive integer greater than or equal to 1.

2. The method of claim 1, wherein the step of displaying the second ID identification on the display unit, and displaying the M first content identifications simultaneously comprises:
   after the second ID identification is displayed on the display unit, acquiring a second display instruction; and
   in response to the second display instruction, displaying the M first content identifications on the display unit.

3. The method of claim 1, wherein the step of extracting N first content identifications from the communication content comprises:
   according to rules that have been preset, selecting Q first content identifications from the communication content, wherein, Q is a positive integer and greater than or equal to 1, and Q is greater than N;
   when the Q first content identifications are selected, calculating the weights of the Q first content identifications; and
   according to a threshold value, and in accordance with the weights of the Q first content identifications, extracting the N first content identifications from the Q first content identifications.

4. The electronic device of claim 3, wherein the extraction unit comprises:
   a second selection unit that extracts Q first content identifications from the communication content according rules preset by the electronic device, Q being a positive integer greater than or equal to 1, and Q being greater than N;
   a calculation unit that calculates the weights of Q content identifications when Q first content identifications are selected; and
   an extraction sub-unit that extracts the N first content identifications from the Q first content identifications according to threshold set by the electronic device and in accordance with the weights of the Q first content identifications.

5. An electronic device having a display unit and a communication unit, a first electronic device having a first ID identification, and the first ID identification being used for indicating a first user, a second electronic device having a second ID identification, the second ID identification being used for indicating a second user, wherein, the first electronic device uses the communication unit to establish communication connection between the first ID identification and the second ID identification with the communication unit of the second electronic device, so that the first user can communicate with the second user and the first electronic device stores a call log of the first ID identification and the second ID identification, characterized in that, comprising:
   a first acquiring unit that acquires a first display instruction; and
   a display unit that displays the second ID identification on the display unit in response to the first display instruction, and displays M first content identifications simultaneously,
   wherein,
      the first content identification is used for characterizing communication content of a call process of the first ID identification and the second ID identification, and M is a positive integer greater than or equal to 1,
      an extraction unit that extracts N first content identifications from the communication content in which N is a positive integer greater than or equal to 1, N being greater than M,
      a first selection unit that receives a selection instruction and extracts the M first content identifications form the N first content identifications.

6. The electronic device of claim 5, wherein the display unit comprises:
   a first display sub-unit, for acquiring a second displaying instruction after displaying the second ID identification on the display unit; and
   a second display sub-unit for displaying the M first content identifications on the display unit in response to the second display instruction.

* * * * *

UNITED STATES PATENT AND TRADEMARK OFFICE
CERTIFICATE OF CORRECTION

| | |
|---|---|
| PATENT NO. | : 8,861,699 B2 |
| APPLICATION NO. | : 13/955753 |
| DATED | : October 14, 2014 |
| INVENTOR(S) | : Jie Cao et al. |

Page 1 of 1

It is certified that error appears in the above-identified patent and that said Letters Patent is hereby corrected as shown below:

TITLE PAGE: ITEM 30, please correct the typographical error in the Foreign Application Number from "CN 201210271815" to "(CN) 201210271815.4"

Signed and Sealed this
Third Day of February, 2015

Michelle K. Lee
*Deputy Director of the United States Patent and Trademark Office*